Sept. 3, 1935.    D. SCIAKY    2,013,585
ELECTRIC WELDING APPARATUS
Filed April 4, 1934
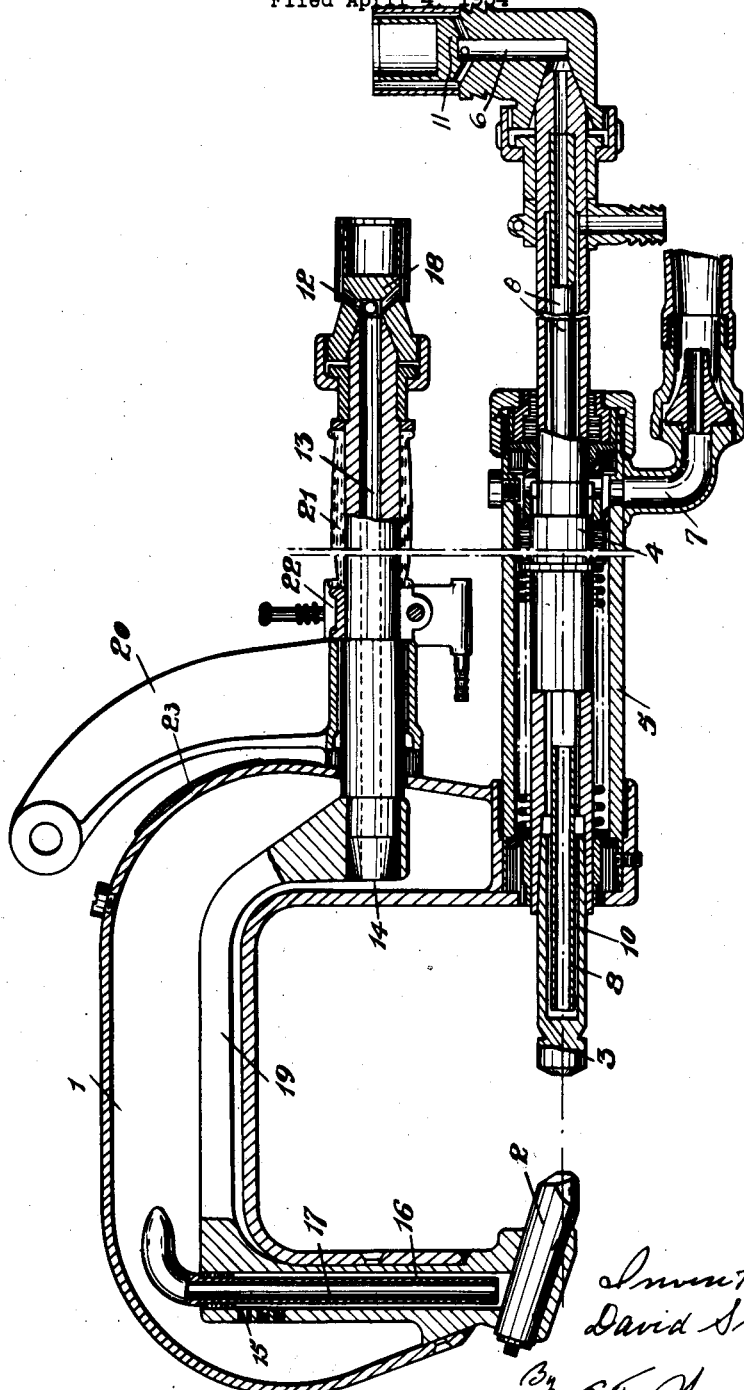

Patented Sept. 3, 1935

2,013,585

UNITED STATES PATENT OFFICE 2,013,585

ELECTRIC WELDING APPARATUS

David Sciaky, Paris, France

Application April 4, 1934, Serial No. 719,023
In France April 6, 1933

3 Claims. (Cl. 219—4)

The present invention relates to electric welding machines and especially welding machines of the type forming a kind of vise, one of the jaws of which supports the movable electrode, while the other jaw supports the stationary electrode.

The object of the present invention is to provide a welding machine of this type which is of lighter weight than machines made according to the prior art capable of supporting equivalent stresses.

According to the present invention, one of the jaws of the vise consists of a hollow body, preferably made of a non-magnetic metal, of high mechanical strength, which supports the high welding pressures, this hollow body serving also to convey the cooling fluid to the electrode.

Current is fed to the electrodes through conductors which pass either on the inside or on the outside of the vise. According to an embodiment of my invention current may also be fed to the electrodes through the vise itself, which is then rendered sufficiently electrically conducting, for instance by means of an electrolytic deposit of metal covering the external surface.

The arrangement according to the present invention makes it possible, while considerably reducing the weight of the apparatus, to obtain a high mechanical resistance, and to facilitate the cooling of the electrodes.

A preferred embodiment of the present invention will be hereinafter described with reference to the accompanying drawing, given merely by way of example, and in which:

The only figure is a sectional view of an electric welding machine according to the invention.

The apparatus shown in the drawing includes a jaw 1 supporting the stationary electrode 2 and with respect to which the movable electrode 3 can slide. Electrode 3 is carried by a piston 4 moving in a cylinder 5 rigidly fixed to jaw 1. The fluid that is to apply the electrodes with the required pressure against the pieces to be welded together is fed through conduit 7. On the other hand, the cooling of the movable electrode is obtained by means of a fluid fed through conduit 6, flowing through tube 8 and escaping through outlet tube 9 after having passed through the annular space 10. Electric current is fed to the movable electrode through a cable fixed to terminal 11.

According to the invention, jaw 1 is hollow and consists preferably of non-magnetic steel in order to reduce as much as possible electric leakage in said jaw. This jaw may for instance consist of four elements, constituting the sides respectively, these elements being assembled together for instance by welding.

Such a jaw, while possessing a high mechanical strength for resisting the pressures that are exerted during the welding operation, makes it possible to greatly reduce the weight of the apparatus.

The stationary electrode is cooled by means of a cooling fluid fed through conduit 12, flowing inside a hollow rod 13, and entering through opening 14 inside the jaw itself. The cooling fluid then passes through ports 15 into annular conduit 16 and, after having cooled the electrode, it issues from the jaw through tube 17.

The stationary electrode is fed with current, in the embodiment shown in the drawing, through a cable welded to terminal 18. The latter is fixed to rod 13 and current is fed through said rod to a conducting member 19 leading to the stationary electrode. Insulation of the two electrodes, that is to say, in point of fact, insulation between the whole of the apparatus and the movable electrode is obtained by means of suitable insulating elements separating the movable electrode and its actuating device from the remainder of the apparatus.

The apparatus is suspended to a suitable support through organ 20 and it is placed in the desired direction by means of a handle 21 on which is located the control organ 22 through which the operator obtains the application of the electrodes against the pieces to be welded, and also the closing of the circuit of the welding transformer.

Of course the arrangement above described is given merely by way of example and the invention is not limited to the specific embodiment illustrated. In particular, current could be fed to the stationary electrode through a conductor located on the outside of the jaw. The circuit through which the cooling fluid flows and the shape of the jaw could also be different.

According to another feature of the present invention, the jaw itself may be used as the conductor for the electric current. In this case, it may, for instance be rendered sufficiently electrically conducting by providing an electrolytic deposit of metal 23 on its surface. In order to avoid the electrolysis effect that might result from the presence of two metals (metal constituting the conductor and metal constituting the jaw) in the cooling fluid (water), the electrolytic metallic coating should preferably be provided only on the external surface of the jaw.

In a general manner, while I have, in the preceding description, disclosed what I deem to be a practical and efficient embodiment of my invention, it should be well understood that I do not wish to be limited thereto as there might be changes made in the arrangement, disposition and form of the parts without departing from the principle of my invention as comprehended within the scope of the appended claims.

What I claim is:

1. An electric welding apparatus of the type described, which comprises, in combination, a C-shaped hollow liquid-tight member made of a non-magnetic metal, an electrode rigidly carried by said member at one end thereof, another electrode movably carried by said member at the other end thereof, so as to be located opposite the first mentioned electrode and to be movable toward, and away from, it, means for feeding electric current to the first mentioned electrode, and means for circulating a cooling fluid through said hollow member.

2. An electric welding apparatus of the type described, which comprises, in combination, a C-shaped hollow liquid-tight member made of a non-magnetic metal, an electrode rigidly carried by said member at one end thereof, another electrode movably carried by said member at the other end thereof, so as to be located opposite the first mentioned electrode and to be movable toward, and away from, it, a conductor located inside said C-shaped member for feeding electric current to the first mentioned electrode, and means for circulating a cooling fluid through said hollow C-shaped member around said conductor.

3. An electric welding apparatus of the type described, which comprises, in combination, a C-shaped hollow liquid-tight member made of a non-magnetic metal, an electrode rigidly carried by said member at one end thereof, another electrode movably carried by said member at the other end thereof, so as to be located opposite the first mentioned electrode and to be movable toward, and away from, it, an electrolytic metal deposit on the external surface of said hollow member electrically connected with said first mentioned electrode for feeding electric current thereto, and means for circulating a cooling fluid through said hollow C-shaped member.

DAVID SCIAKY.